United States Patent

Kawabe et al.

[11] Patent Number: 5,797,450
[45] Date of Patent: Aug. 25, 1998

[54] OIL COOLER FOR AUTOMOBILES

[75] Inventors: Tsuyoshi Kawabe; Hiroshi Yoneguchi; Atsushi Arisaka; Takahiro Kuwabara, all of Wako; Tadamichi Aoyama, Hadano, all of Japan

[73] Assignees: Honda Giken Kogyo Kabushiki Kaisha; Toyo Radiator Co., Ltd., both of Tokyo, Japan

[21] Appl. No.: 848,057

[22] Filed: Apr. 29, 1997

[30] Foreign Application Priority Data

May 2, 1996 [JP] Japan ................ 8-135907
May 2, 1996 [JP] Japan ................ 8-135908

[51] Int. Cl.⁶ .................. F28D 9/00; F28F 3/08
[52] U.S. Cl. ........................... 165/167; 165/916
[58] Field of Search .............. 165/41, 167, 119, 165/916

[56] References Cited

FOREIGN PATENT DOCUMENTS

| 551545 | 7/1993 | European Pat. Off. | 165/916 |
| 563951 | 10/1993 | European Pat. Off. | 165/916 |
| 2-110294 | 4/1990 | Japan | 165/916 |
| 6-17634 | 1/1994 | Japan | 165/916 |
| 6-159973 | 6/1994 | Japan | 165/916 |
| 6-194081 | 7/1994 | Japan | 165/916 |

*Primary Examiner*—Allen J. Flanigan
*Attorney, Agent, or Firm*—Sughrue, Mion, Zinn, Macpeak & Seas, PLLC

[57] ABSTRACT

A base plate 20 is provided with an oil inflow hole 20b in the form of a through-hole. The oil inflow hole 20b includes an area overlapping oil inlet communication holes 1 of plates 5 within a region inside an annular grove 20a of the base plate 20, and has a planar shape extending beyond the outer rim of the overlapping area. Thus, in the base plate constituting a contact end when the oil cooler is mounted to the engine block, a decrease in communication resistance of the oil communication hole provided therein as well as a smooth circulation of oil is achieved.

5 Claims, 8 Drawing Sheets

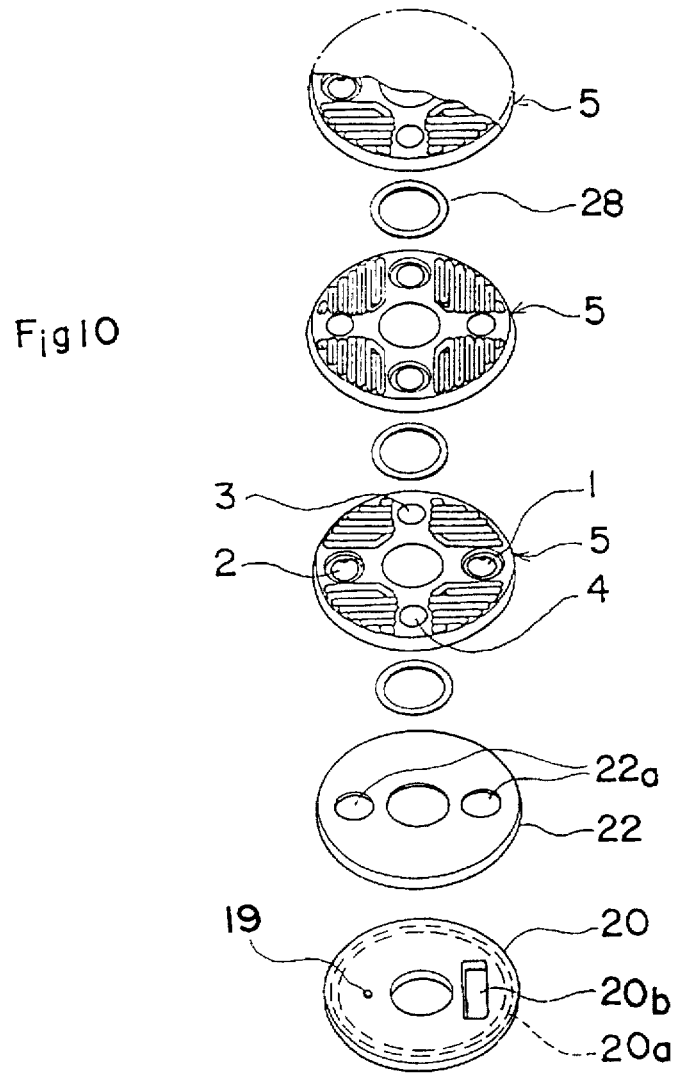

OIL COOLER FOR AUTOMOBILES

BACKGROUND OF THE INVENTION

1. Field of the Invention

The present invention relates generally to an oil cooler for automobiles adapted to be removably secured to the outer surface of an engine block of the automobile by way of sealing element and bolts and comprising a core in the form of a stack of a multiplicity of dish-like plates each having an oil inlet communication hole and an oil outlet communication hole in pairs, and more particularly to an oil cooler capable of reducing the pressure loss which may occur upon the inflow of oil from the engine block into the core of the oil cooler.

2. Description of the Related Art

Such an oil cooler for automobiles is disclosed in for example U.S. Pat. No. 4,708,199. This oil cooler comprises a core in the form of a stack of a multiplicity of circular dish-like plates, the plates being joined together at their contact portions in a liquid-tight manner. Each plate has a central hole and four communication holes arranged apart by 90 degrees from each other in the circumferential direction surrounding the central hole. Within the interior of the core there are alternately formed an oil communication path and a cooling water communication path in every other plate. The core is secured to the engine block of the automobile by way of sealing elements and hollow bolts. The cooling water is introduced and discharged through the outer periphery of the core, and the oil through an oil port of the engine block. The sealing element between the oil cooler and the engine block is in the shape of a ring and is joined to the lower end of the core.

However, if the core is mounted to the engine block with the ring-like sealing element largely being in contact with the surface of the engine block, the mounting strength of the core may possibly be insufficient. This means that an application of external force or vibration to the core might readily cause a deformation of the sealing part.

Thus, in such an oil cooler, the present invention employs a base plate having a large thickness and integrally joined to one end of the core, the base plate having at its periphery an annular groove into which the sealing element is fitted. Furthermore, an oil port is formed inside the annular groove. In some cases, the oil port may be positioned on the inner side of the oil communication holes, that is, closer to the central holes, of the plates. It is the object of the present invention to ensure a smooth circulation of oil in such a case.

Referring to FIGS. 11 to 13 there is depicted an oil cooler for automobiles which was taken into consideration in the process of completing the present invention. FIG. 11 is a longitudinal sectional view of the same, FIG. 12 is an exploded explanatory view of its core, and FIG. 13 is a schematic diagram viewed from the direction of the arrow of a line XIII—XIII of FIG. 11.

In this oil cooler for automobiles, a base plate 20 is superposed on the lower end of a stack of a multiplicity of plates 5 by way of an end plate 22. A tank 17 is superposed on the upper end thereof by way of another end plate 22, with the elements being brazed together at their contacts. An oil flow passage and a cooling flow passage are formed in every other plate 5 in the direction of stacking of the plates 5. The underside of the base plate 20 is formed with an annular groove for receiving the sealing element 29. The oil cooler is mounted on the engine block 21 by way of the sealing element 29, and the oil cooler and the engine block 21 are fastened together by means of the tubular center bolt 27. Then, a casing 23 incorporating an oil filter 24 is removably threaded to the upper end of the tubular center bolt 27.

Each plate 5 has an oil inlet communication hole 1, a cooling water outlet communication hole 4, an oil outlet communication hole 2 and a cooling water inlet communication hole 3 which are arranged apart 90 degrees from each other in the circumferential direction. The end plates 22 have communication openings 22a which align with the oil inlet communication hole 1 and the oil outlet communication hole 2, respectively. The base plate 20 has an oil hole 18. In this example, the opening of the oil hole 18 is substantially in the shape of a semicircle which aligns with a part of the communication opening 22a of the end plate 22 and with a part of the oil inlet communication hole 1 of the plate 5 within the region inside the annular groove 20a formed in the back side of the base plate 20 (FIGS. 12 and 13). The oil 25 derived from the oil supply hole 21a of the engine block 21 flows through the oil hole 16 of the base plate 20 and the communication opening 22a of the end plate 22 into the oil inlet communication holes 1 of the plates. The oil 25 further passes in an arcuate manner through the interior of the oil flow passage formed in every other plate 5, and is delivered from the oil outlet communication hole 2 through the oil chamber 9 to the oil filter 24 within the casing 23.

When the base plate 20 is provided with substantially the semicircular oil hole 18 which aligns with only a part of the oil inlet communication hole 1 in this manner, the oil will be subjected to an increased pressure loss in the process of flowing through the oil hole 18. It has also turned out that this results in an increased burden of the oil pump as well as impairment of a smooth circulation of the oil.

Provision of a bypass for directly guiding the oil to the oil filter is known as a protective measure against clogging which may occur in the oil communication path within the interior of the core of the heat exchanger. However, this often resulted in a complicated structure.

SUMMARY OF THE INVENTION

In order to solve the above problems, therefore, the present invention employs the following construction.

According to the aspect of the present invention, the oil cooler for automobiles comprises a core in the form of a stack of a multiplicity of plates each having the same shape, each of the plates having an oil inlet communication hole and an oil outlet communication hole in pairs, and a cooling water inlet communication hole and a cooling water outlet communication hole in pairs, the core having an oil flow passage and a cooling water defined between the adjacent plates and alternately in the direction of stacking; and a base plate superposed on one end of the core and having on its outer surface at the periphery an annular groove for receiving a sealing element, the base plate having an oil inflow port formed inside and in the vicinity of the annular groove, the oil inflow port being positioned in such a manner that its edge closer to the annular groove partly closes the oil inlet communication hole of the plate in plan view, the base plate having a thickness larger than that of the plate; wherein the oil inflow port formed in the base plate is in the form of a planar through-hole including an area overlapping the oil inlet communication hole inside the annular groove, the oil inflow port extending outward in the circumferential direction beyond the opening edge of the communication hole within a region inside the annular groove; and wherein the base plate is joined to the outer surface of an engine block by way of the sealing element in such a manner that an oil supply hole of the engine block communicate with the oil inflow port.

In the thus constructed oil cooler of the makes it possible to mninimize the pressure loss as far as possible which may occur when the oil passes through the oil inflow hole of the base plate having a relatively large thickness. This will relieve the burden of the oil pump and ensure a smooth circulation of oil.

Preferably, the oil cooler of the present invention further comprises an end plate interposed between the one end of the core and the base plate, the end plate having a communication opening aligned with the oil inlet communication hole, the end plate having a thickness sufficiently larger than that of the plate but significantly smaller than that of the base plate.

Such an arrangement will ensure a smoother circulation of oil by way of the opening of the end plate and add to the freedom of design on opening shape of the oil inflow port of the base plate.

Preferably, the base plate has an oil bypass hole 19 whose opening is significantly smaller than that of the oil inflow port 20, the oil bypass hole communicating with the oil outlet communication hole of the plate, the oil bypass hole being leading to the oil supply hole of the engine block.

Such an arrangement will enable some of the oil to be always bypassed in small quantities. This will lower the level of the pressure loss to relieve the burden of the oil pump and ensure a smooth circulation of oil. Also, in case where clogging occurs between the adjacent plates of the oil cooler, a more quantity of oil can be delivered to the oil filter by way of the bypass hole.

BRIEF DESCRIPTION OF THE DRAWINGS

The above and other objects, aspects, features and advantages of the present invention will become more apparent from the following detailed description in light of the accompanying drawings, in which:

FIG. 10 is an exploded perspective view of constituent elements of the core of FIG. 9;

DESCRIPTION OF THE PREFERRED EMBODIMENTS

Preferred Embodiments of the present invention will now be described with reference to the accompanying drawings.

Figure 1:
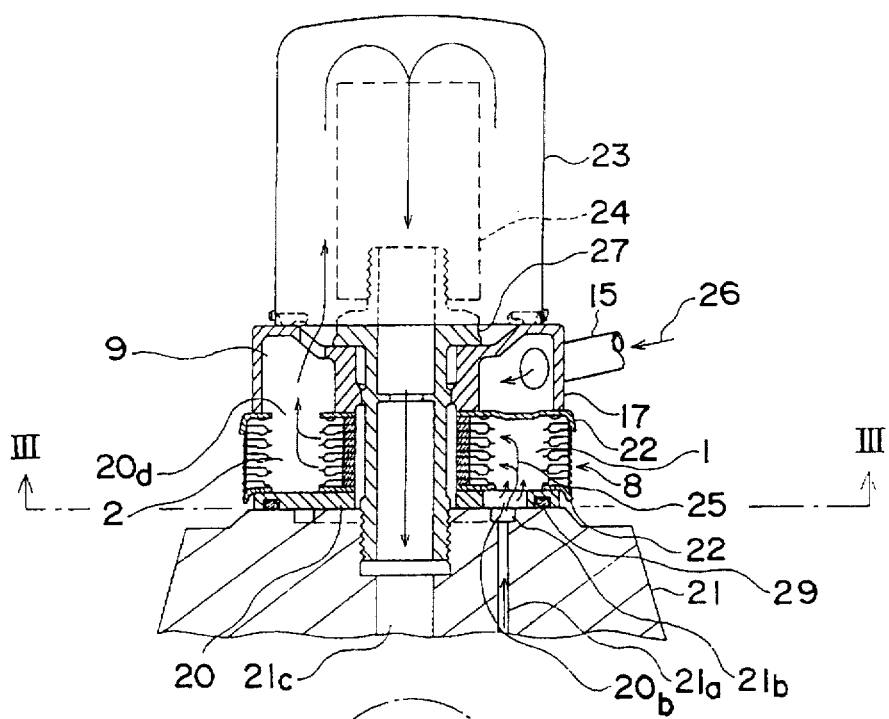
FIG. 1 is a longitudinal sectional view showing the state of use of an oil cooler in accordance with the present invention.
Figure 2:
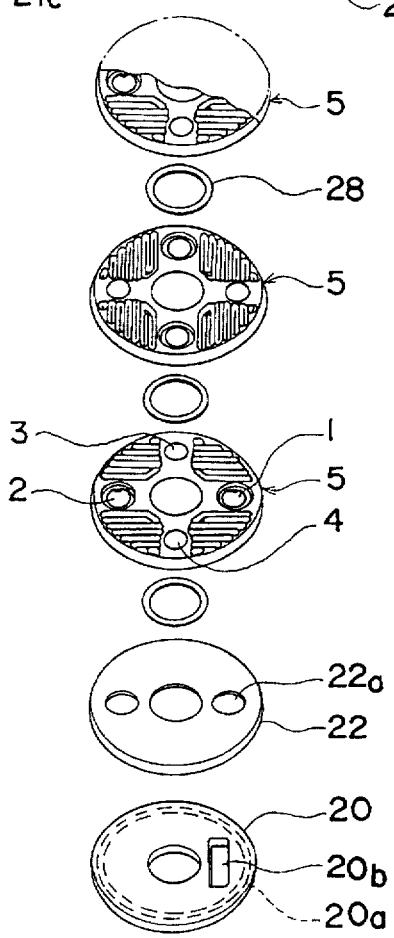
FIG. 2 is an exploded perspective view of constituent elements of a core of the oil-cooler.
Figure 3:
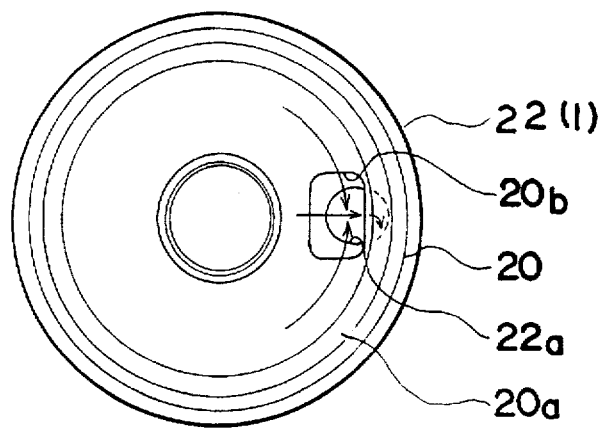
FIG. 3 is a schematic diagram viewed from the direction of the arrow of a line III—III of FIG. 1.
Figure 4:
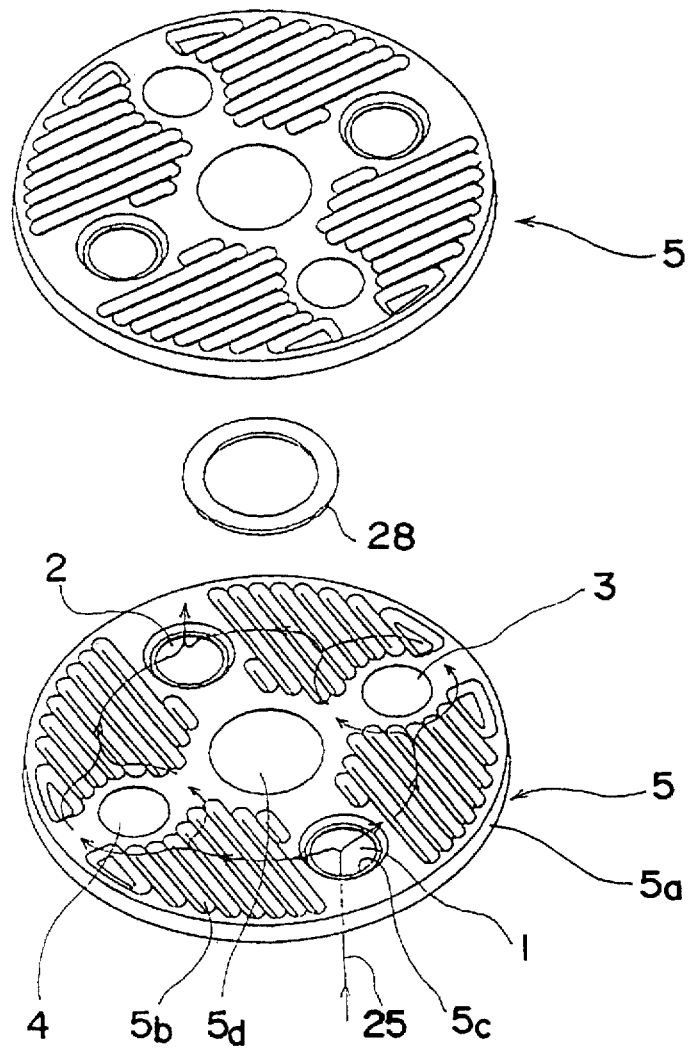
FIG. 4 is an enlarged perspective explanatory view of a pair of plates of the oil cooler.
Figure 5:
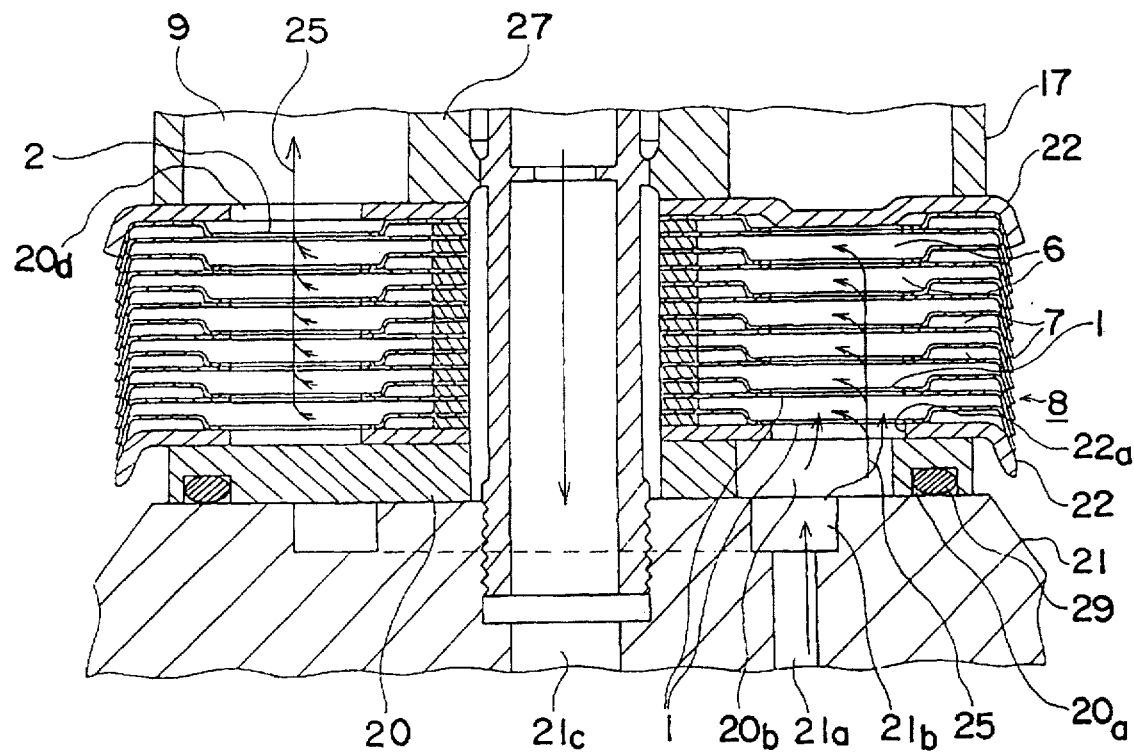
FIG. 5 is an enlarged longitudinal sectional view of the oil cooler on an oil flow passage side.
Figure 6:
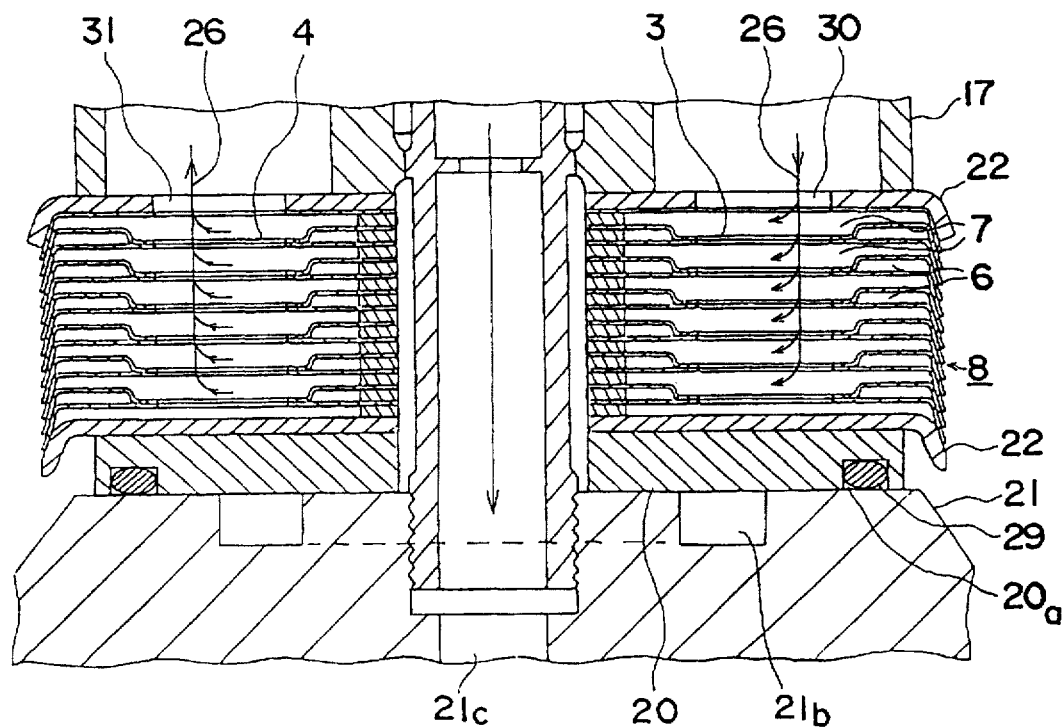
FIG. 6 is an enlarged longitudinal sectional view of the oil cooler on a cooling water flow passage side, which is taken at a position turned by 90 degrees in the circumferential direction relative to the position of FIG. 5.

FIG. 1 is a longitudinal sectional view showing the environment of use of an oil cooler in accordance with the present invention, FIG. 2 is an exploded perspective view of constituent elements of a core of the oil cooler, and FIG. 3 is a schematic sectional view taken along a line III—III of FIG. 1 and viewed from the direction of an arrow. FIG. 4 is an enlarged perspective explanatory view showing a pair of plates 5 of the oil cooler of the present invention. FIG. 5 is an enlarged longitudinal sectional view of the oil cooler on the side of an oil flow passage 6, and FIG. 6 is an enlarged longitudinal sectional view of the oil cooler on the side of a cooling water flow passage 7, which is taken at a position obtained by turning 90 degrees in the circumferential direction from the position of FIG. 5.

This oil cooler comprises a core 8 in the form of a stack of a multiplicity of dish-like plates 5, land a base plate 20 secured to the lower end of the core 8 by way of an end plate 22. The dish-like plate 5 is by way of an example an aluminum press molded form having an outer diameter of about 100 mm and a thickness of about 0.6 mm, and is provided with an oil inlet communication hole 1 and an oil outlet communication hole 2 in pairs which are diametrically opposed or 180 degrees apart from each other around its central hole and each have an inner diameter of about 8 mm. The end plate 22 has a thickness of about 1.2 mm and is provided with a pair of-communication openings 22a which are aligned with the oil inlet communication hole 1 and the oil outlet communication hole 2 of the plate 5. The base plate 20 has a thickness of about 4 mm and is provided with an annular groove 20a at its periphery and an oil inflow port 20b inside and near the groove 20a. As shown in FIG. 3, the oil inflow port 20b includes, inside the annular groove 20a, a bole portion aligned with the oil inlet communication hole land the communication opening 22a, and is formed as in this embodiment substantially a rectangular, planar through-hole extending toward the periphery. More specifically, within a region on the inner side of the annular groove 20a, the oil inflow port 20b includes in its entirety the area overlapping with the oil inlet communication hole 1 or the communication opening 22a and takes the form of a planar through-hole enlarged in the circumferential direction and inward in the radial direction.

Figure 13:
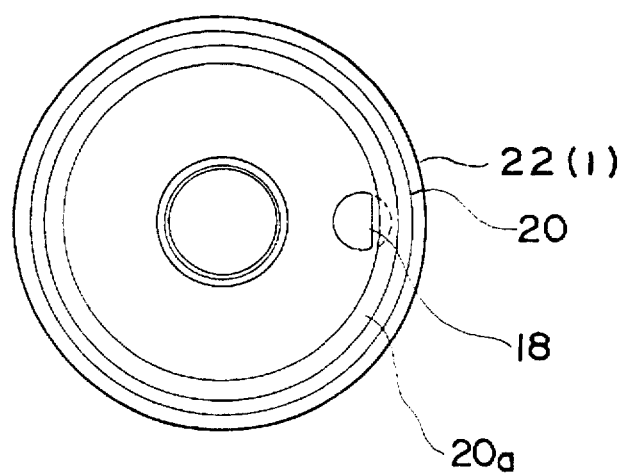
FIG. 13 is a schematic diagram viewed from the direction of the arrow of a line XIII—XIII of FIG. 11.

Referring to FIG. 5, oil 25 flows through an oil supply hole 21a and a block side annular groove 21b into the oil inflow port 20b. From the oil inflow port 20b, the oil 25 flows through the communication opening 22a into the oil inlet communication holes 1 of the plates 5. Since the flow passage of the oil inflow port 20b has a sufficiently large cross section, the oil 25 is subjected to a relatively small pressure loss when it passes through the oil inflow port 20b. Experiments revealed that by virtue of the employment of the oil inflow port 20b, the pressure loss throughout the oil cooler has reduced by 30% to 40% compared with a substantially semicircular oil hole 18 formed in the base plate 20 of FIG. 13. At that time, the thickness of the base plate 20 is 4.0 mm, the flow passage cross sectional area of the oil inflow port 20b is 1.3 cm$^2$, and the opening area of the oil inlet communication hole 1 and the communication opening 22a is 1.0 cm². The opening area of the oil hole 18, as a comparison example, of FIG. 13 is 0.7 cm², the other conditions are the same.

Figure 8:
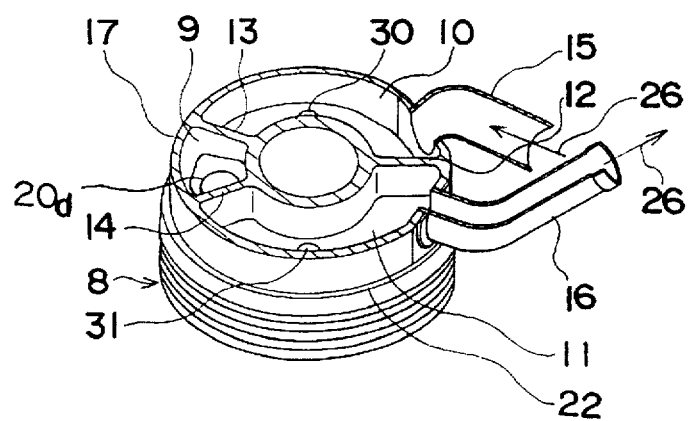
FIG. 8 is a schematic sectional view taken along a line VIII—VIII of FIG. 7.

After having been introduced into the oil inlet communication holes 1 of the core 8, the oil 25 flows semi-arcuately as shown in FIG. 4 through oil flow passages 6 formed in every other plate 5, and is then guided through a hole 20d of another end plate 22 and an oil chamber 9 of FIGS. 1 and 8 into a casing 23, and further passes through an oil filter 24 and is finally refluxed through a tubular type center bolt 27 into an oil return 21c of an engine block 21.

The plates 5 constituting the core 8 each have a dish-like shape having a flared edge 5a at its periphery as is apparent from FIGS. 5 and 6. Each plate 5 has a central hole 5d and four openings surrounding the central hole 5d and apart 90 degrees from one another in the circumferential direction, two of which have a flanged opening edge, with the others having no flanged opening edge, the flanged openings and the flangeless openings being alternately arranged. The flanged opening edge 5c protrudes in the same direction as the direction in which the edge 5a of the plate 5 protrudes. The region excluding the openings is formed with a corrugation 5b. The thus configured multiplicity of plates 5 are stacked in such a manner that vertically adjacent ones are shifted by 90 degrees from one another. As a result of this, the openings with the flanged opening edges 5c come into contact with the flangeless opening edges of the underlying plate 5. A spacer 28 is interposed between the opening edges of the central holes 5d of the adjacent plates 5. The inner side of the edge 5a of the plate 5 is brought into contact with the outer surface of the edge 5a of the underlying plate 5.

The two end plates 22 are arranged on the upper and lower ends, respectively, of the core 8 consisting of the plates 5 thus stacked. The base plate 20 is disposed on the lower end plate 22, and a tank 17 is disposed on the upper end plate 22. The contacts of the elements are brazed in a liquid-tight manner. The periphery on the outer surface side of the base plate 20 is formed with the annular groove 20a into which is fitted a sealing element 29 in the form of an O-ring made of rubber.

Figure 7:
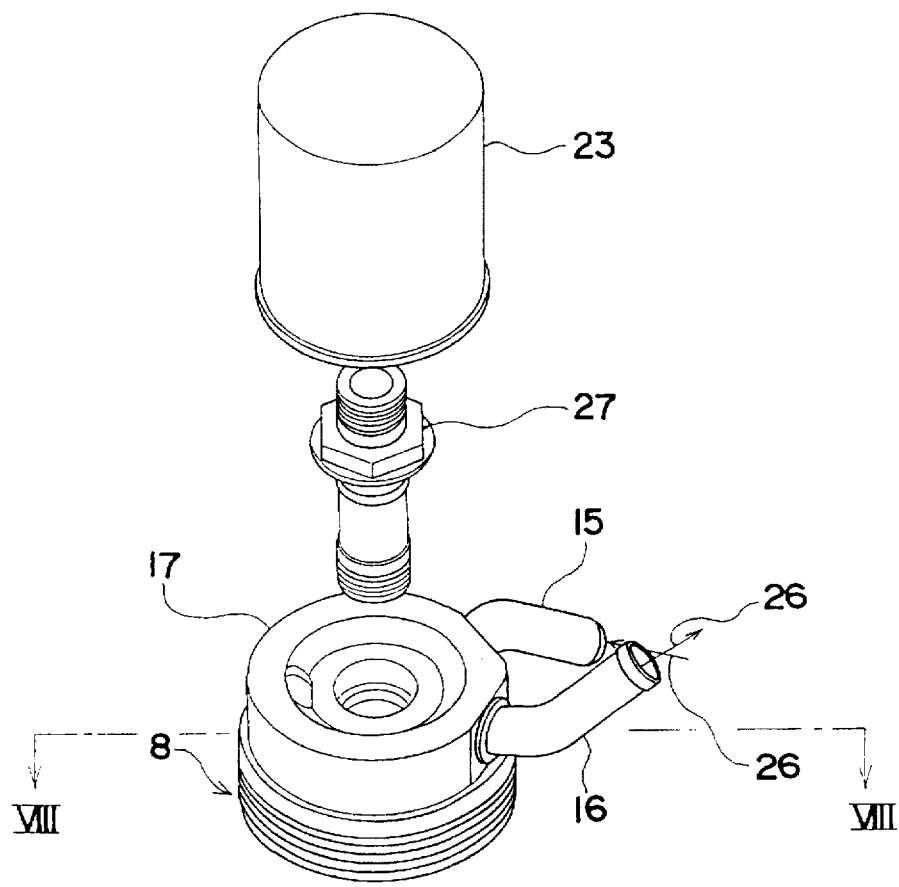
FIG. 7 is an exploded perspective view of major constituent elements of the oil cooler.

The thus constructed oil cooler is threadedly fastened to the engine block 21 by means of the tubular center bolt 27 as shown in FIGS. 1 and 7. The casing 23 with an oil filter is removably threaded at its central portion onto the upper end of the tubular center bolt 27.

The interior of the tank 17 is configured as shown in FIG. 8. That is, the tank 17 has three substantially radially extending partitions 12, 13, 14 to define there among the oil chamber 9, a cooling water inlet chamber 10 and a cooling water outlet chamber 11. The adjacent cooling water inlet chamber 10 and cooling water outlet chamber 11 are provided respectively with an inlet pipe 15 and an outlet pipe 16. Such an arrangement will add to the freedom in mounting position of the inlet pipe 15 and the outlet pipe 16, facilitating the piping so as not to interfere with the adjacent equipment within the engine room. In other words, such an arrangement will make it possible to position intimately closer the openings for the inlet pipe 15 and the outlet pipe 16 with the partition 12 interposed therebetween or to increase the interval between the openings.

It is to be noted that the oil chamber 9 is formed to have a capacity smaller than that of the cooling water inlet chamber 10 and the cooling water outlet chamber 11.

Cooling water 26 introduced from the inlet pipe 15 flows through the cooling water inlet chamber 10 and the cooling water supply hole 30, and from the cooling water inlet communication hole 3 through the cooling water flow passage 7 in a semicircular manner, and further from the cooling water outlet communication hole 4 through the cooling water return hole 31 and the cooling water outlet chamber 11, and exits the outlet pipe 16. At that time, the cooling water 26 and the oil 25 undergo a heat exchange within the core 8.

Figure 9:
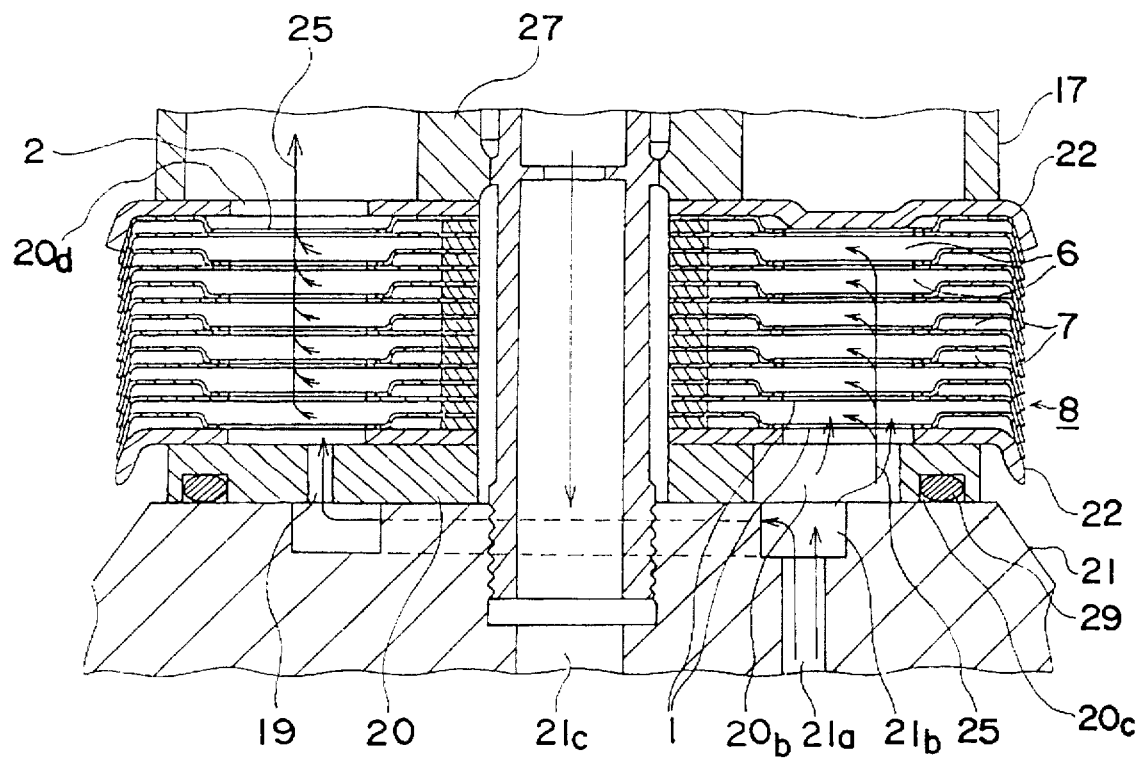
FIG. 9 is an enlarged longitudinal sectional view of another embodiment of the oil cooler in accordance with the present invention.
Figure 11:
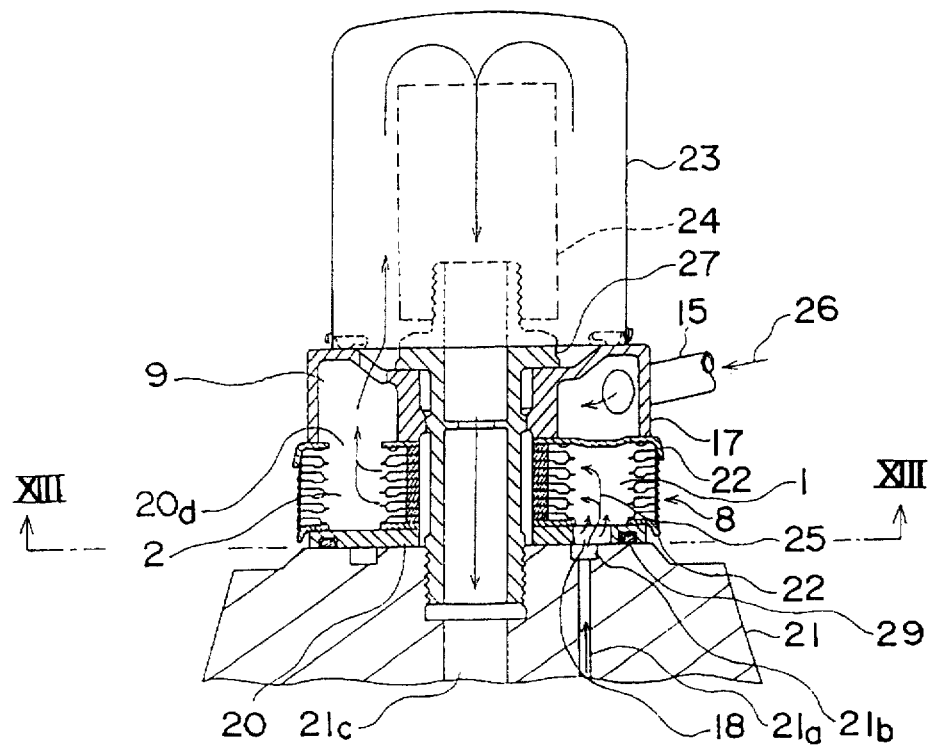
FIG. 11 is a sectional view of a reference oil cooler for the comparison with the oil cooler in accordance with the present invention.
Figure 12:
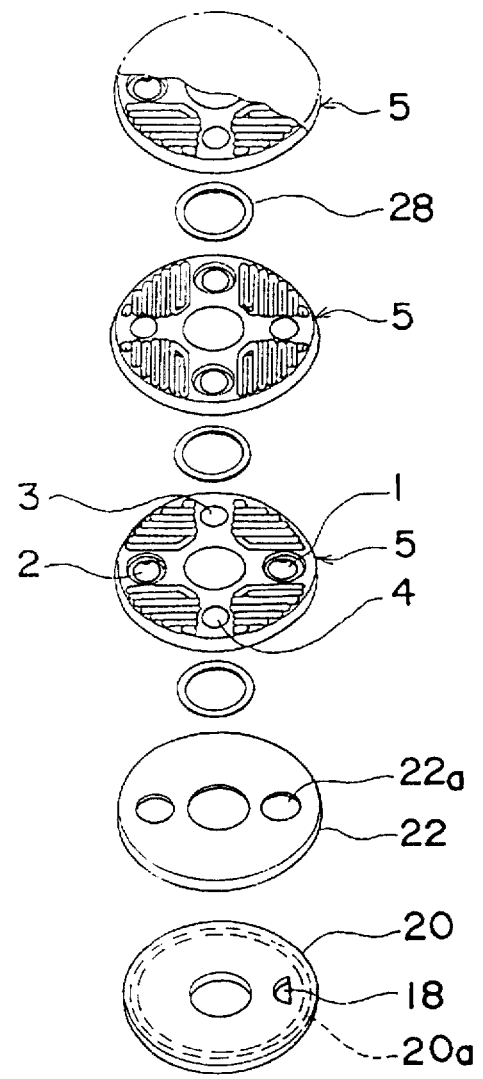
FIG. 12 is an exploded perspective view of constituent elements of the core of the reference oil cooler.

Referring now to FIGS. 9 and 10, there is depicted another embodiment of the present invention, which differs from the oil cooler of FIGS. 5 and 2 merely in that the base plate 20 is provided with an oil bypass hole 19 which is apart from 180 degrees from the oil inflow port 20b around the center of the base plate 20 and is significantly smaller than the oil inflow port 20b.

The oil bypass hole 19 allows a part of oil introduced from the oil supply hole 21a of the engine block 21 to pass therethrough as shown in FIG. 9.

More specifically, the oil 25 introduced from the oil supply hole 21a of the engine block 21 into the block side annular groove 21b is allowed to flow through the oil inflow holes 20b and the oil bypass holes 19 into the core 8. Since the cross section of the oil bypass hole 19 is designed to be significantly smaller than that of the oil inflow hole 20b, the major part of the oil 25 flows by way of the oil inflow holes 20b into the oil inlet communication holes 1 of the plates constituting the core 8. On the other hand, a small amount of oil 25 passes through the oil bypass holes 19 which are small openings of the base plates, to directly enter the oil outlet communication holes 2, and flows into the casing 23. By virtue of the formation of such an oil bypass 19, the pressure loss caused by communication of oil is diminished and the burden of the pump is relieved to ensure a smooth circulation of oil. Furthermore, in case clogging occur between the adjacent plates, a greater amount of oil can be delivered through the oil bypass hole 19 directly to the oil filter.

Although the present invention has been described in connection with certain preferred embodiments, it should be clear that various changes and modifications can be made without departing from the sprit and scope of the claimed invention.

What is claimed is:

1. An oil cooler for automobiles comprising:

a core in the form of a stack of a multiplicity of plates each having the same shape, each of the plates having an oil inlet communication hole and an oil outlet communication hole in pairs, and a cooling water inlet communication hole and a cooling water outlet communication hole in pairs, the core having an oil flow passage and a cooling water defined between the adjacent plates and alternately in the direction of stacking; and a base plate superposed on one end of the core and having on its outer surface at the periphery an annular groove for receiving a sealing element, the base plate having an oil inflow port formed inside and in the vicinity of the annular groove, the oil inflow port being positioned in such a manner that its edge closer to the annular groove partly closes the oil inlet communication hole of the plate in plan view, the base plate having a thickness larger than that of the plate; wherein the oil inflow port formed in the base plate is in the form of a planar through-hole including an area overlapping the oil inlet communication hole inside the annular groove, the oil inflow port extending outward in the circumferential direction beyond the opening edge of the communication hole within a region inside the annular groove; and wherein the base plate is joined to the outer surface of an engine block by way of the sealing element in such a manner that an oil supply hole of the engine block communicate with the oil inflow port.

2. An oil cooler for automobiles according to claim 1, further comprising:

an end plate interposed between the one end of the core and the base plate, the end plate having a communication opening aligned with the oil inlet communication hole, the end plate having a thickness sufficiently larger than that of the plate but significantly smaller than that of the base plate.

3. An oil cooler for automobiles according to claim 1, wherein the base plate has an oil bypass hole 19 whose opening is significantly smaller than that of the oil inflow port 20, the oil bypass hole communicating with the oil outlet communication hole of the plate, the oil bypass hole being leading to the oil supply hole of the engine block.

4. An oil cooler for automobiles according to claim 1, further comprising:

a tank disposed on the other end of the core in the direction of stacking, the tank having three substantially radially extending partitions to define an oil chamber communicating with the oil outlet communication hole, a cooling water inlet chamber communicating with the cooling water inlet communication hole, and a cooling water outlet chamber communicating with the cooling water outlet communication hole, the cooling water inlet chamber and the cooling water outlet chamber adjacent to each other having openings for a cooling water inlet pipe and for a cooling water outlet pipe, respectively.

5. An oil cooler for automobiles according to claim 4, wherein two adjacent partitions defining the oil chamber are arranged closer to each other in order to ensure that the capacity of the oil chamber is smaller than that of the cooling water inlet chamber and the cooling water outlet chamber.

* * * * *